US010831535B2

(12) United States Patent
Leng et al.

(10) Patent No.: US 10,831,535 B2
(45) Date of Patent: Nov. 10, 2020

(54) REDUCING MINIMUM OPERATING VOLTAGE THROUGH HETEROGENEOUS CODES

(71) Applicant: International Business Machines Corporation, Armonk, NY (US)

(72) Inventors: Jingwen Leng, Yorktown Heights, NY (US); Alper Buyuktosunoglu, White Plains, NY (US); Pradip Bose, Yorktown Heights, NY (US); Ramon Bertran Monfort, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 16/237,747

(22) Filed: Jan. 1, 2019

(65) Prior Publication Data

US 2020/0210229 A1    Jul. 2, 2020

(51) Int. Cl.
| | |
|---|---|
| *G06F 9/46* | (2006.01) |
| *G06F 9/48* | (2006.01) |
| *G06F 1/26* | (2006.01) |
| *G06F 9/50* | (2006.01) |
| *G06F 8/41* | (2018.01) |
| *G06T 1/20* | (2006.01) |

(52) U.S. Cl.
CPC ............. *G06F 9/4881* (2013.01); *G06F 1/26* (2013.01); *G06F 8/41* (2013.01); *G06F 9/5027* (2013.01); *G06T 1/20* (2013.01)

(58) Field of Classification Search
CPC .................................................. G06F 9/4881
USPC ........................................................ 718/100
See application file for complete search history.

(56) References Cited

U.S. PATENT DOCUMENTS

| | | | |
|---|---|---|---|
| 7,831,517 B1 * | 11/2010 | Vijay | .................... G06F 21/121 |
| | | | 705/59 |
| 7,895,453 B2 | 2/2011 | Kasahara et al. | |
| 9,753,525 B2 | 9/2017 | Haider et al. | |
| 9,946,676 B2 | 4/2018 | Wagh et al. | |
| 9,996,127 B2 | 6/2018 | Vikinski et al. | |
| (Continued) | | | |

FOREIGN PATENT DOCUMENTS

WO    WO2008087160 A1    7/2008

OTHER PUBLICATIONS

Ramon Bertran. Energy Characterization Methodologies for CMP SMT Processors Systems. PhD Thesis Computer Architecture Department, UPC, Campus Nord UPC, D6 Building / C6 Building, Jordi Girona 1-3, 08034 Barcelona, Dec. 2014.

(Continued)

*Primary Examiner* — Evral E Bodden
(74) *Attorney, Agent, or Firm* — Rabin Bhattacharya; Kurt Goudy; Lou Percello, Attorney, PLLC (57) ABSTRACT

Preferred embodiments of systems and methods are disclosed to reduce a minimal working voltage, Vmin, and/or increase the frequency of Vmin while executing multi-threaded computer programs with better reliability, efficiency, and performance. A computer complier complies multiple copies of high-level code, each with different a different set of resource allocators so system resources are allocated during simultaneous execution of multiple threads in a way that allows reducing Vmin at a given reference voltage frequency and/or increasing the frequency of Vmin at a given Vmin value.

20 Claims, 5 Drawing Sheets

(56) References Cited

U.S. PATENT DOCUMENTS

| | | | |
|---|---|---|---|
| 2004/0088488 A1* | 5/2004 | Ober | G06F 9/3851 |
| | | | 711/125 |
| 2012/0291040 A1 | 11/2012 | Breternitz et al. | |
| 2013/0268943 A1* | 10/2013 | Solihin | G06F 9/5011 |
| | | | 718/104 |
| 2018/0164864 A1 | 6/2018 | Peffers et al. | |

OTHER PUBLICATIONS

Systematic Energy Characterization of CMP/SMIT Processor Systems via Automated Micro-Benchmarks, Ramon Bertran et al. 2012 IEEE/ACM 45th Annual International Symposium on Microarchitecture.

* cited by examiner

REDUCING MINIMUM OPERATING VOLTAGE THROUGH HETEROGENEOUS CODES

GOVERNMENT RIGHTS

This invention was made with Government support under Contract number HR0011-13-C-0022 awarded by the Defense Advanced Research Projects Agency (DARPA). The Government has certain rights to this invention.

BACKGROUND

Vmin is the minimal voltage needed by a computer system to execute a computer program at a given frequency. If the supply voltage on the voltage buses in the computer system drops below Vmin, components of the computer system, e.g. memories, Graphical Processing Units (GPUs) and Central Processing Units (CPUs), can fail to operate correctly. Accordingly, in many computer systems a conservative voltage guard band (VGB) is included above Vmin to determine the total system voltage, V, to guarantee the necessary Vmin to meet a design performance level for the system. The VGB compensates for variations in voltages caused in the computer system by factors such as device aging, variations in performance between devices in the system, degradation induced by inverse-temperature dependencies, frequency changes in the supply voltage, voltage droop (caused by higher current demand,) and system noise, e.g. voltage demand variations due to synchronized allocation of system resources causing large changes in current demand.

As computer devices become more pervasive there are applications that require smaller and lower voltage power supplies. One way to accommodate this requirement is to reduce the Vmin of the system.

In addition, more modern systems are multi-threaded, in that there are multiple programming threads simultaneously executing on one or more cores of a single or multiple CPUs of the system, e.g. multi-core or many core systems. This increases the chances of two or more threads accessing system resources, e.g. computer memory, registers, etc. at the same time, or nearly the same time. Accessing multiple system resources in a synchronous or homogeneous manner like this (e.g. "activity alignment") causes large and frequent changes in load, e.g. current demand, from the supply voltage, which result in more voltage/power/current transients and noise for the system. Therefore, in prior art configurations like this, the system Vmin needs to increase to insure components of the system have adequate voltage to operate at these noise/transient levels at a given operating frequency of the voltage supply. Higher Vmin results in more current leakage in the system, more system inefficiencies, shorter battery life, and possible lower execution times and poorer performance due to lower voltage supply frequency.

SUMMARY

In a preferred embodiment, the present invention is a system and method to reduce the minimal working voltage, Vmin, and/or increase the frequency of Vmin at a given voltage while executing multithreaded computer programs to result in better reliability, efficiency, and performance.

In a preferred embodiment, the computer system comprises one or more central processing units (CPUs), one or more memories, at least one operating system, and a voltage supply powering the central processing units and memories by providing the required operating current at or above a minimum voltage, Vmin, at a given reference voltage frequency of the voltage provided by the voltage supply. Vmin, the minimum voltage, is the minimum voltage high enough to maintain operation of the CPUs and memories at the reference voltage frequency while the system performs a program function.

A compiler receives an input of multiple copies of a high-level program that performs the program function. The compiler compiles each high-level copy to produce a respective executable binary version, where each respective executable binary version has an allocator set of one or more resource allocators. The resource allocators in each allocator set is different for each executable binary version. Therefore, any threads spawned by the operating system and simultaneously executed will be performing the same or nearly the same program functions but will require system resources that are different and/or allocated at different times. This unsynchronized or heterogenous allocation of system resources, smooths out "demand peaking" and/or noise in the power supply and/or system power buses and enables lowering Vmin and/or increasing the reference voltage frequency at a given Vmin.

Methods of operation, selecting configurations, and optimization are disclosed.

DETAILED DESCRIPTION

In preferred embodiments, the present invention lowers the Vmin (i.e. minimal working voltage) required to execute multi-threaded programs, for example, in Open MultiProcessing (OpenMP) in CPUs or Single Instruction Multiple Threads (SIMT) in Graphical Processing Units (GPUs.)

Multi-threaded programs can run concurrently on a multi-core or many core CPU or GPU processors. In some embodiments, because each core in the processor executes the same code, the likelihood of cores demonstrating activity alignment is substantial. Thus, the synchronization-induced voltage droops and system noise can be significant and causes the system Vmin value for a given program execution to increase and/or the Vmin frequency to decrease.

To reduce the degree of synchronization (activity alignment or homogeneous execution) and therefore lower the Vmin value, one embodiment of the present invention uses a compiler-based technique. This proposed technique creates N number of different executable (binary) versions of the original program functions (e.g. high-level source code) through changing resource allocators, e.g. the compilation flags, each used in compiling a copy of the source code. The manipulation of the resource allocators, e.g. compilation flags, introduces a "core heterogeneity" during the simultaneous execution of the different binary versions, or threads spawned from those binary versions, by one or more cores, CPUs, and/or GPUs. As a result, the possible degree of synchronization (core homogeneous execution or activity alignment,) and system noise is reduced while different cores (CPUs and/or GPUs) execute different binary versions of the original program function of the source program. A lower Vmin value lets the processor(s) and other system components operate at a lower voltage for better energy efficiency, operate at a higher frequency for better performance, and/or operate with enhanced reliability. Because the system noise and voltage fluctuations are reduced, the voltage guard band (VGB) is reduced and the total system voltage provided by the power supply can be reduced.

Figure 1:
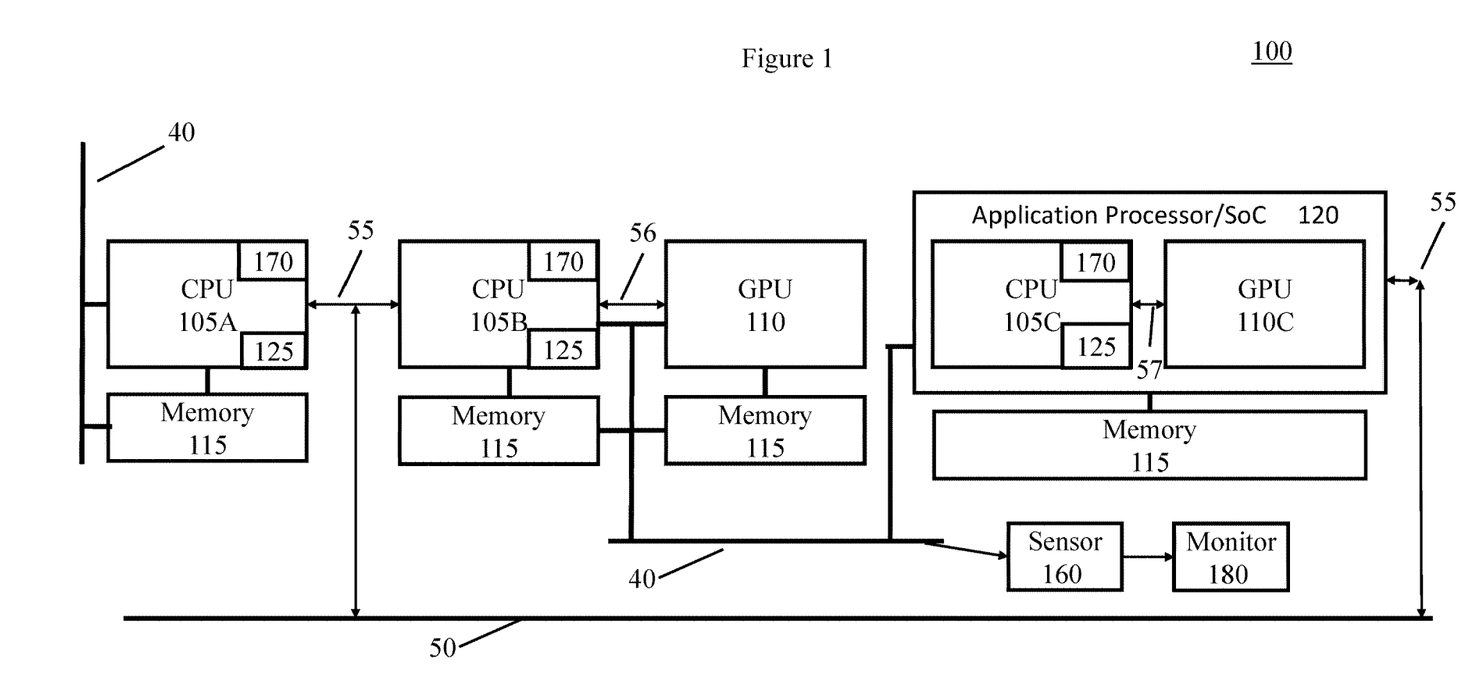
FIG. 1 is a block diagram showing alternative embodiments of computing systems using the present invention.

FIG. 1 is a block diagram showing alternative embodiments of computing systems 100 using the present invention.

In general, each of these systems has one or more central processing units, CPUs 105, a compiler 125, one or more operating systems 170, and one or more memories 115. Typically, the systems 100 have a network connection 55 that connects through one or more network interfaces to a computer network 50.

In one example of the computer systems 100, one or more CPUs 105A may have one or more cores, each core capable of executing one or more threads (see below.) In some embodiments, a CPU can have 4 to 8 cores.

In an alternative example, the CPU 105B has a communication interface 56 to one or more Graphical Processing Units (GPUs) 110 with one or more communication connections 56 between the CPUs 105B and the GPUs 110. In this example, the CPUs 105B can have one or more cores, and the CPUs 105B and/or the cores are capable of executing multiple threads. The CPUs 105B and the GPUs 110 may share common system resources like memory 115, power supplies 40, etc.

In another alternative example, the CPU 105C, GPU 110, and/or other co-processor functions reside on a single chip, e.g. System on a Chip (SoC) 120. This system 120 has a communication link 57 between the CPU 105C and the GPU 110C and/or other coprocessing functions. Memory 115 can be on board the SoC 120 and/or connected externally to the SoC 120. One or more network connections 55 can be included. Versions of this system 120 can be disposed on larger substrates, wafers, boards, etc.

Each of these computing systems 100 requires a power supply 40. The power supply 40 powers the system components, system resources, etc. In some embodiments, the power supply 40 provides power to multiple processors 105, GPUs 110, memories 115, system resources, etc. connected together to create a larger system.

Figure 3:
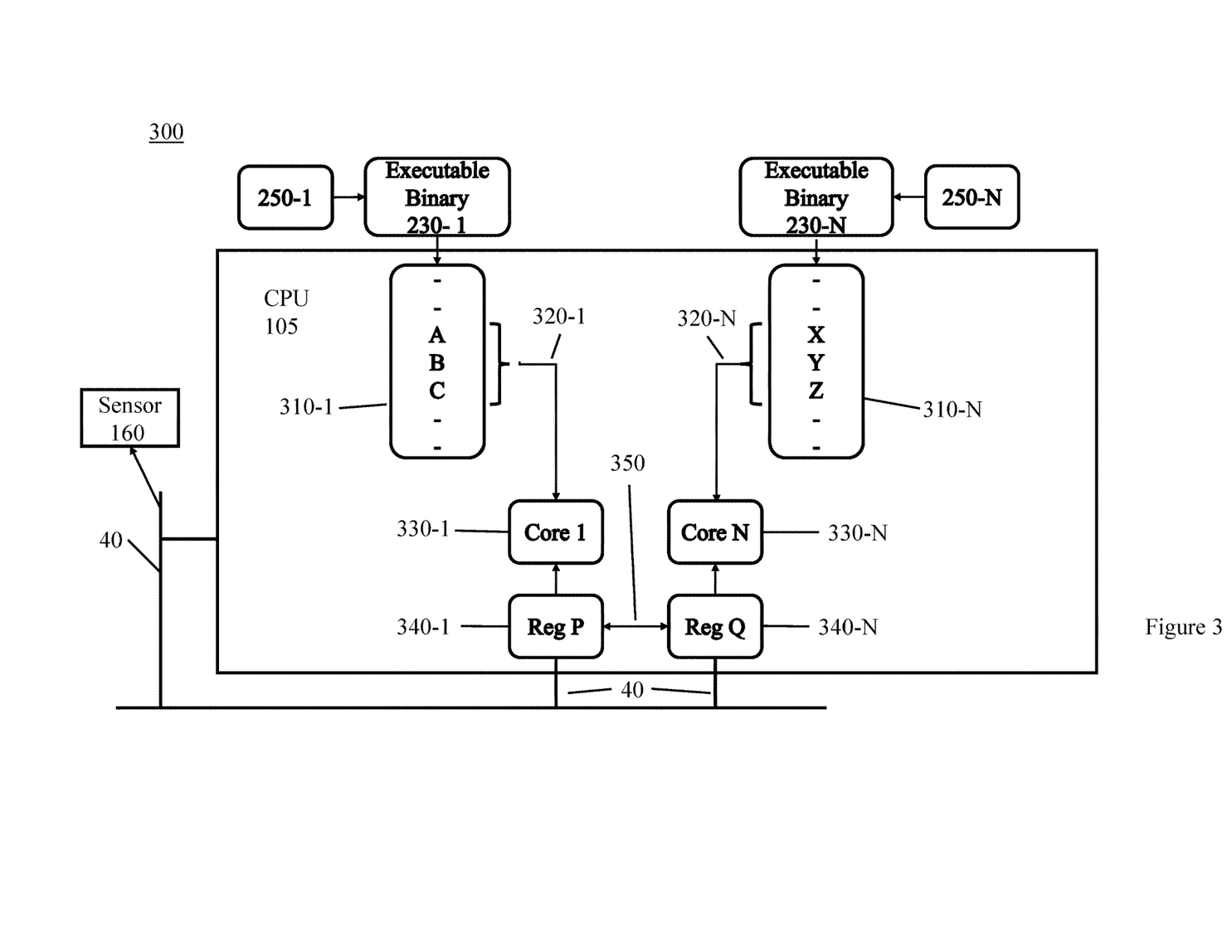
FIG. 3 is a block diagram showing how threads are simultaneously executed to provide a non-synchronous allocation of system resources.

System resources (e.g. see 340) can include registers (either individually or in banks), memories (shared or not), cashe memories, memory access, CPUs 105 or GPUs 110 or other coprocessors used or accessed, network 50 connections or switching, or current demands from the voltage supply 40, executing a binary or thread or an instruction set in a CPU 105 and/or a core 330, etc.

The power supply 40 can be a power distribution system which distributes power to various location in the systems 100 at different voltage levels.

The power supply 40 can provide a system voltage which is nominally at a level above Vmin plus the Voltage Guard Band (VGB.) The power supply 40 also has a reference voltage frequency. The system voltage is chosen to provide current to the system throughout the execution of program functions at a given reference voltage frequency, without dropping below Vmin.

In some embodiments, sensors 160 instrumented on one or more of the power supplies 40 measure power supply 40 voltage, reference voltage frequency, and/or other power supply 40 parameters, e.g. noise, current, etc. In addition, monitors 180 can be installed to scan, log, and/or alarm the parameters measured by the sensors and, in some embodiments, provide analytical information to external systems about the performance of the power supply 40 or monitoring or control signals.

It is envisioned that other co-processor functions like math co-processing also can exist in these configurations 100 and be powered by the voltage supply 40.

Figure 2:
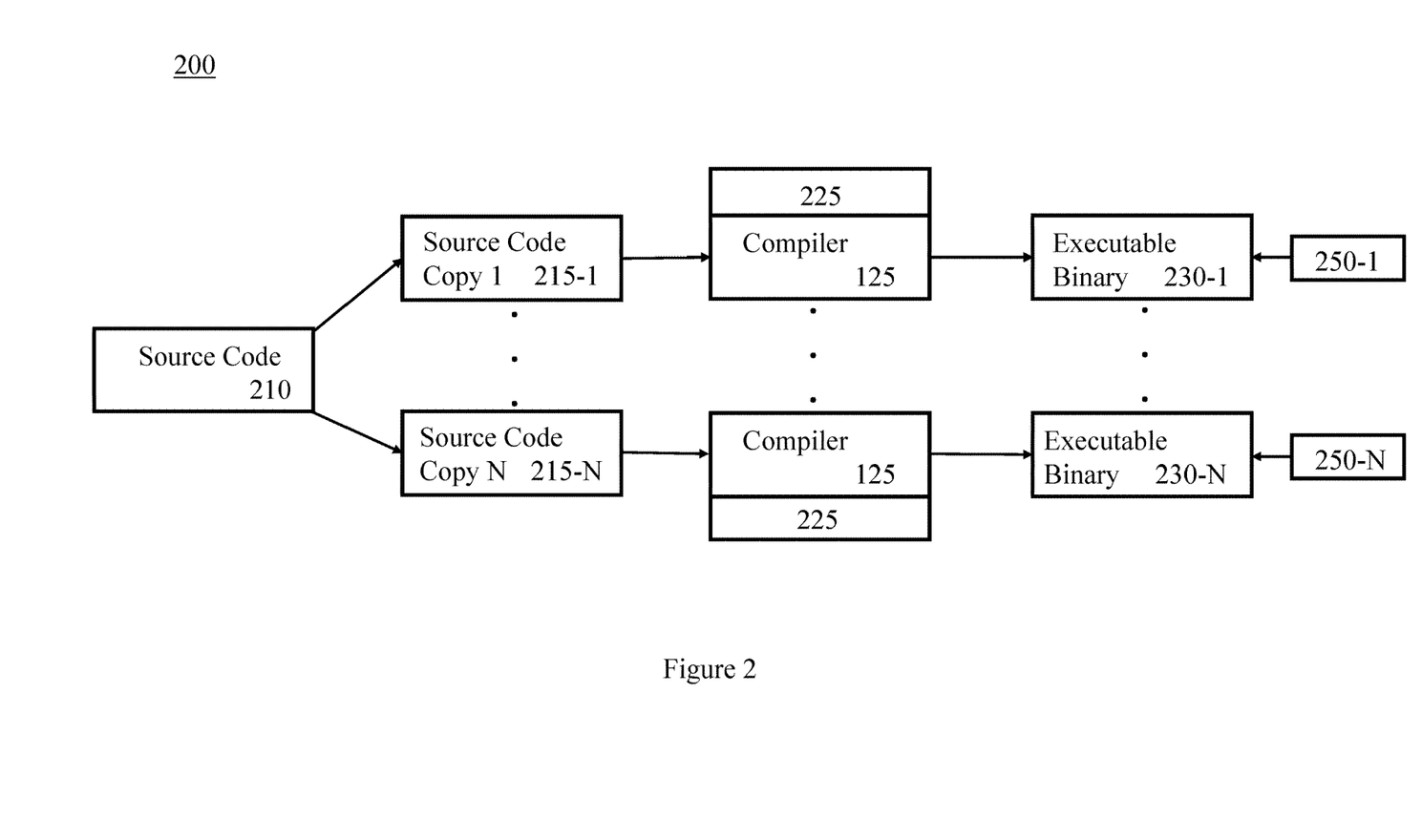
FIG. 2 shows a process flow diagram of an example compilation of high-level program/source code being compiled in one embodiment of the present invention.

FIG. 2 shows a process flow diagram of an example compilation of high-level program/source code 200 being compiled in one embodiment of the present invention.

The source/program code 210 is designed to perform a program function. An example of the program running on one or more of the systems 100 could include a CPU 105 computation and GPU 110 computation. There can also be codes in the example program 210 that setup the GPU 110 before launching the GPU 110 computation.

First there are N number of copies 215 of the source/program code 210 made. The copies (215-1 through 215-N) can be made by a stage in the compiler 125 or by another function in the system 100.

The compiler 125 has multiple stages of compilation and optimization that perform different operations. In addition, the compilation of each of the copies 215 of the source/program code 210 uses its own respective resource allocators 225. Different resource allocators 225 can be created at different stages of compilation and optimization. In some embodiments, resource allocators 225 can be create at "run-time," e.g. during a "Just In Time" (JIT) compilation, which can involve feedback from already executed programs.

The resource allocators 225 are definitions, constraints, logic, etc. including: number of registers available to the respective executable binary 230 compiled 125, compiler flags, one or more optimization levels, target architectures, special instructions, control commands, data and execution configurations, etc. In preferred embodiments, compiler flags define and/or control these resource allocators 225 which can control system resources (340, below.)

Since each of the resource allocators 225 or allocator set 250 is different for the compilation 125 of each respective copy 215, a different version of an executable binary (230-1 through 230-N) is created by the compiler 125 from each of the source code copies 215. Each respective executable binary 230 compiled has a different resource allocator set 250 controlling resources during the execution of the respective executable binary 230.

Thus, executable binary 230-1 will have an allocator set 250-1 and execution binary 230-N will have an allocator set 250-N. Therefore, when the executable binaries 230 are executed (and/or threads spawned from the executable binaries 230 are run) at runtime, the system resources will be allocated to each of the executable binaries 230 in a different way, time, configuration, and/or duration. This will work even when the program function adopts a Single Program Multiple Data (SPMD) execution model where each CPU 105 and/or GPU 110 thread 320 executes the same function but on different input data because each input data set is executed on a different version of the executable binaries 230.

For example, each version of the executable binaries 230 will have a different set of compiler flags.

FIG. 3 is a block diagram showing how threads 320 are simultaneously executed to provide a non-synchronous allocation of system 300 resources.

As a non-limiting example, the CPU 105 receives two or more versions of the executable binaries 230 created by the compiler 125. Each executable binary 230 has a different resource allocator set 250 that controls allocation of system resources during execution of the respective executable binaries 230 and/or any threads 320 spawned from the executable binary 230.

Each instruction, e.g. A, B, C, X, Y, Z, in the executable binary 230 is entered into a respective pipeline 310, typically in the CPU 105. In one preferred embodiment of multi-threaded operation, threads 320 are spawned from the pipeline of instructions 310 to each be executed on a respective individual core 330 of the CPU 105.

In this non-limiting example, thread 320-1 is executed by core-1, i.e. 330-1. An allocator set, ABC, in this thread 320-1, allocates system resources 340-1 to the execution of the thread 320-1. In this example, the allocated system resource 340-1 is a Register P.

Simultaneously, thread 320-N is executed by core-N, i.e. 330-N. An allocator set, XYZ, in this thread 320-N, allocates system resources 340-N to the execution of the thread 320-N. In this example, the allocated system resource 340-N is a Register Q.

Because the allocator sets 250 cause different instructions (ABC versus XYZ) in each of the threads 320, even though the threads 320-1 and 320-N execute simultaneously, the respective system resources Register P 340-1 and Register Q 340-N will be allocated at different times and/or different ways by the allocator set 250, e.g. compiler flags.

Accordingly, the allocation of system resource is non-synchronous, more heterogeneous, with less activity alignment 350. This results in less noise, e.g. smaller transients and reduced and less frequent "peaking" in current loads from the power supply 40. Therefore, Vmin and/or the Voltage Guard Band (VGB) can be reduced at a given reference voltage frequency and/or the reference voltage frequency can be increased for a given Vmin of the voltage supply 40.

In one preferred embodiment, the program function adopts a Single Program Multi-data (SPMD) execution model, where each CPU 105 or GPU 110 thread executes the same program function of code 210 but on different input data. Each core 330 still executes a A set of threads 320 with the same program function defined by code 210. However, different cores 330 will run different binary versions (230-1 through 230-N) of the program function 210. Using the present invention, the code heterogeneity increases the non-synchronized allocation of system resources even though there is concurrent execution of multiple numbers of common threads 320.

In preferred embodiments, sensors 160 monitor the parameters of the power supply 40.

Other embodiments are envisioned. Multiple threads 320 can be executing simultaneously on one or multiple CPUs 105 in multithreading configurations. A single CPU 105 can execute multiple threads in multitasking configurations and/or multiple CPUs 105 can execute multiple threads in symmetric multiprocessing configurations with or without multiple cores 330 in these CPUs 105.

The invention operation is not dependent on the hardware configuration. For a given hardware configuration, the invention will execute all executable binaries 320 and/or their spawned threads 330 so that allocation of system resources 340 is performed more non-synchronously 350.

Figure 4:
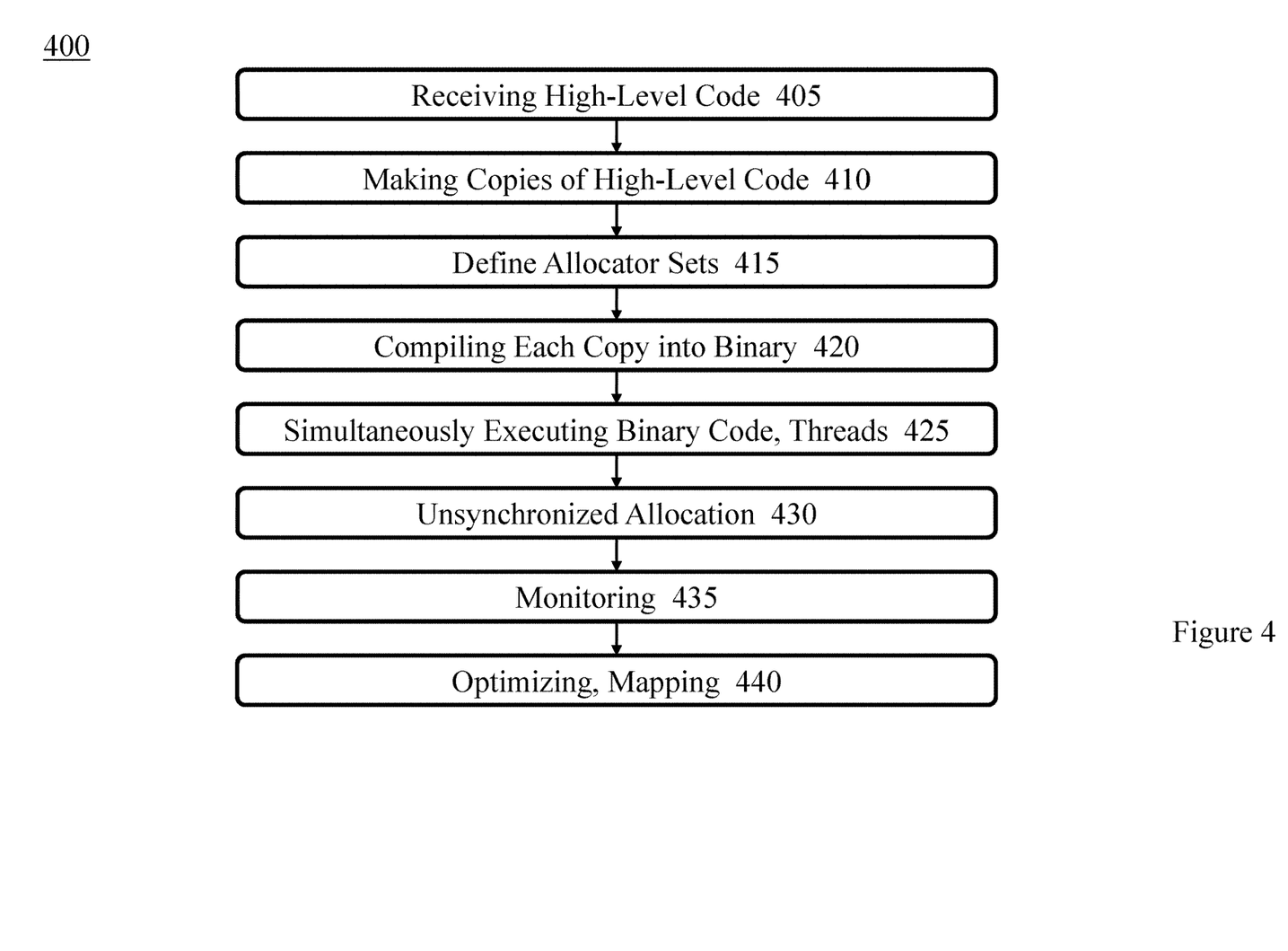
FIG. 4 is a process showing the steps performed in one preferred embodiment of the present invention.

FIG. 4 is a process 400 showing the steps performed in one preferred embodiment of the present invention.

The process 400 begins by receiving 405 a copy of high-level code, e.g. source code, that is designed to perform a program function.

The system 100 makes N number of copies 410 of the high-level code. This copying 410 can be performed by a stage of the compiler 125 or any other process in the system 100.

Allocator sets 250 of resource allocators 225 are defined 415.

Each copy 410 of the high-level code 405 is then compiled 420 with a different allocator set 250 to create a different executable binary 230. In some embodiments, different stages of the compiler compile different resource allocators. In some alternative embodiments, some of the resource allocators 225 can be complied at run-time.

The executable binaries 230, and/or the threads 320 they spawn, are simultaneously executed 425.

The allocation of resources is unsynchronized (430, 350) because the allocator sets 250 do not allocate the same (or similar) system resources 340 at the same time and/or in the same way.

In preferred embodiments, system 100 parameters and/or performance are monitored 435 for one or more implementations of the invention. For example, Vmin, VGB, voltage supply 40, and/or reference voltage frequency can be scanned, logged, alarmed, and recorded by sensors 160 and monitors 180. Analytics can be performed by these sensors 160 and monitors 180.

In other preferred embodiments, optimization and/or mapping is performed 440. For example, there are various ways to select the N number of copies, which system resources 340 to allocate, which resource allocators 225 to include in each allocator set 250, how to assign a thread 320, choosing which core 330 executes which thread 320, etc. For example, one execution can be configured to have a single thread block with 25 individual threads while another thread block might be configured to have 5 thread blocks with 5 threads each. Each thread block would have the same threads but the threads would be configured and executed differently.

In one non-limiting example of mapping 440, a thread 320 is mapped to an executable binary 230 by matching a thread number to a particular executable binary. For instance, if the thread number is below a value, T1, the thread is assigned to a first executable binary 230. If the thread number is above the value, T1, the thread is assigned to a second executable binary 230.

In a second non-limiting example of mapping, the executable binary 230 is chosen by which core 330 is executing the thread 320. An instruction is executed to find out which core 330 is running the instruction then the executable binary 230 to be run on the respective core is chosen by the number of the core 330.

In a third non-limiting example of mapping, historical profile information is generated by trying different versions and combinations of the executable binaries 230, allocator sets 250, and core mappings and determining metrics for Vmin, reference voltage frequency, supply voltage 40, voltage noise, and other system performance measures, e.g. cycle time for completing one or more tasks. Metrics might include a measure of performance per watt.

Profile information is checked to determine the best mapping of a given executable binary 230 to a core 330 based on one or more of the metrics.

In a fourth non-limiting example of mapping, a monitor 180 monitors one or more of the executable binary versions 230 on a core 330 based on information determined during one or more prior executions. During these prior executions, one or more instructions are executed to determine which core is running. Then information is collected as the application runs in the prior executions to find a best mapping between the versions and cores in terms of a metric executed by the core 330. Different versions 230 are tried with different core 330 mappings while collecting information like Vmin, reference voltage frequency, supply voltage 40, voltage noise, and other system performance measures. Optimal matching of binary versions 230 and cores 330 is based on these metrics determined as one or more of prior executions of the application/program function runs.

Figure 5:
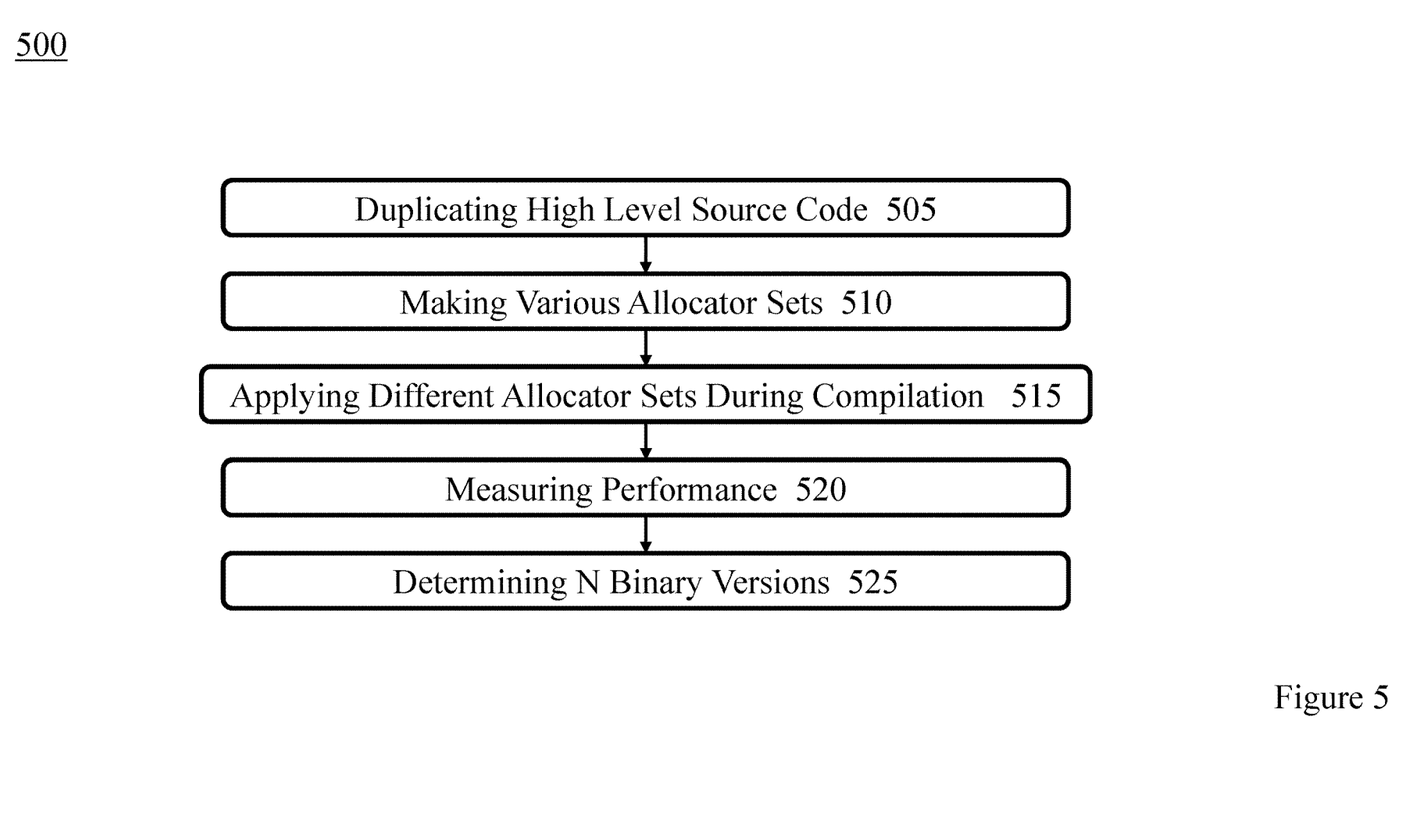
FIG. 5 is a flow chart of a method to determine how to optimize the number of executable binaries and/or allocator sets.

FIG. 5 is a flow chart of a method 500 to determine how to optimize the number of executable binaries 230 and/or allocator sets 250.

Suppose there is N number of targeted versions of the high level (source) code 201 performing a program function. The compiler first makes N copies 505 of the function's original source code and renames each copy 215.

The compiler 125 then determines N number 510 of allocator sets 250, e.g. N sets 250 of different compiler flags, and applies those allocator sets 250 to those renamed function copies 215 during compilation (420, 515) to get N number versions of executable binaries 230.

In step 520, the system executes various executable binaries 230, combinations of those executable binaries 230, and/or threads 320 spawned from the executable binaries 230. Each executable binary 230 is compiled with an individual allocator set 250 that is different than any other allocator set 250 used with other renamed function copies 215. As a result, each executable binary 230 has a function call protocol that is different than other executable binaries 230. Therefore, each of the executable binaries 230 have different performance characteristics during execution.

At execution time, system parameters are measured for each configuration and performance is measured 520 according to one or more metrics.

Optimization criteria is used to determine how many versions N should be made 525 and which allocator sets 250 should be used.

Pruning techniques are applied 525 to eliminate executable binaries versions 230 that don't equal or exceed selected metrics and/or are redundant to the performance of other more efficient executable binary versions 230. In a preferred embodiment, the optimal number of executable binary versions 230 is selected so the system performs optimally without adding any further executable binary versions 230 or the point at which an added version 230 produces an efficiency increase below a marginal threshold. After knowing N, we can determine the number of copies of high-level source 215 to make and also the number of allocator 230 sets required for the compilation 130.

In one preferred embodiment, a method of determining the N versions of allocation sets 250 starts with all possible resource allocators (e.g. compilation flags.) The compiler 125 then compiles 420 the source code copies 215 to different executable binaries versions 230, versions 230-1 to 230-N, using a different respective allocator sets 250 (set of compiler flags) for each identical copy 215 of the source code 210. The sensors 160 and/or monitors 180 measure performance measures like the Vmin and other system performance measures for each of these binaries 230 and combinations thereof. The number N of versions of executable binaries 230 is selected according to versions 230 provide the best performance characteristics compared to a criteria. One method is to pick optimum performance looking at the Vmin-performance frontier, e.g. using Pareto efficiency analysis that selects executable binaries 230 that in a set that no other set can outperform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer system comprising:
one or more central processing units (CPUs), one or more memories, an operating system, and a power supply powering the central processing units and memories by providing current at greater than a minimum voltage, the minimum voltage being the minimum voltage high enough to maintain operation of the CPUs and memories at a reference voltage frequency while performing a program function; and
a compiler capable of receiving an input of a high-level program that performs the program function, making a plurality of high-level copies of the single high-level program, and compiling each high level copy to produce a respective executable binary version, where each respective executable binary version has a allocator set of one or more resource allocators capable of allocating one or more system resources to one or more threads spawned by the operating system from the respective executable binary version at execution, the compiler assigning a different allocator set to each respective binary version,
wherein during the simultaneous execution of the threads, the resource allocators in the respective allocation sets allocate system resources to each of the simultaneously executing threads in an unsynchronized allocation so that one or more of the following occurs: the minimum voltage is reduced and the reference voltage frequency increases.

2. A system, as in claim 1, where the CPU is one or more of the following:
a single core machine running multiple threads, a multiple core machine, a multiple core machine running multiple threads per core, a multiple core machine executing a single thread per core, a CPU-GPU computing system, a Graphical Processing Unit (GPU), and one or more processes on a system on a chip (SoC).

3. A system, as in claim 1, where the resource allocator is one or more of the following: a flag, a compiler flag, a definition, a constraint, a logic, an optimization level, a targeted architecture, a special instruction, a control command, and a configuration.

4. A system, as in claim 1, where the system resource is one or more of the following: a register, a register bank, a memory, a shared memory, a cashe memory, a memory controller, an execution time of a CPU, an execution time of a GPU, a connection, a switch, and any function that requires current from the power supply.

5. A system, as in claim 1, where one or more of the CPUs is a graphical processing unit (GPU).

6. A system, as in claim 1, where there are N number of executable binary versions and N number of different allocator sets, each of the executable binary versions assigned one and only one of the allocator sets.

7. A system, as in claim 1, where each of the simultaneously executing threads is a single program multiple data (SPMD) thread.

8. A system, as in claim 1, where one or more of the CPUs has two or more cores and each core is capable of executing one or more of the threads.

9. A system, as in claim 1, where the number of executable binary versions is determined by applying different allocator sets, measuring system performance to determine performance profiles, and pruning executable binary versions with allocator sets with poor performance.

10. A computer system comprising:
one or more central processing units (CPUs), one or more memories, an operating system, and a power supply powering the central processing units and memories by providing current at greater than a minimum voltage, the minimum voltage being the minimum voltage high enough to maintain operation of the CPUs and memories at a reference voltage frequency while performing a program function;
a compiler capable of receiving an input of a high-level program that performs the program function, making a plurality of high-level copies of the single high-level program, and compiling each high level copy to produce a respective executable binary version, where each respective executable binary version has a allocator set of one or more resource allocators capable of allocating one or more system resources to one or more threads spawned by the operating system from the respective executable binary version at execution, the compiler assigning a different allocator set to each respective binary version; and
a performance monitor that monitors one or more of the i minimum voltage and ii reference voltage frequency and determines an allocation of one or more of the system resources, wherein during the simultaneous execution of the threads, the resource allocators in the respective allocator sets allocate system resources to each of the simultaneously executing threads in an unsynchronized allocation so that one or more of the following occurs: the minimum voltage is reduced and the reference voltage frequency increases.

11. A system, as in claim 10, where the performance monitor uses a thread identification to allocate the thread to the executable binary version at execution.

12. A system, as in claim 10, where the performance monitor assigns one or more threads to a core using a pre-defined physical core map.

13. A system, as in claim 10, where the performance monitor uses profile information derived from experimental metrics to assign one or more of the executable binary versions to a core.

14. A system, as in claim 10, where the performance monitor assigns one or more of the executable binary versions to a core based on information determined during one or more prior executions.

15. A method comprising:
imputing a high-level program into a computer system, the computer system comprising one or more central processing units (CPUs), one or more memories, an operating system, and a power supply powering the central processing units and memories by providing current at greater than a minimum voltage at a reference voltage frequency;
making a plurality of copies of the high-level program;
producing a plurality of versions of allocator sets of one or more resource allocators;
compiling each high-level copy to produce a respective executable binary version, where each respective executable binary version uses one of the allocator sets;
spawning one or more threads from each of the respective executable binary versions;
simultaneously executing the threads to perform a program function so that the allocator set used by each of the respective executable binary versions allocates system resources to each of the simultaneously executing threads in an unsynchronized allocation so that one or more of the following occurs: the minimum voltage is reduced and the reference voltage frequency increases.

16. A method, as in claim 15, further comprising:
profiling a performance of one or more of the respective executable binary versions applying one or more of the allocator sets; and
retaining the executable binary versions with allocator sets that perform well according to one or more metrics and pruning the remaining executable binary versions to create a chosen set of executable binary versions.

17. A method, as in claim 16, where the one of the metrics is the value of minimum voltage.

18. A method, as in claim 17, where executable binary versions with a minimum voltage value above a threshold are pruned.

19. A method, as in claim 16, where the one of the metrics is the value of reference voltage frequency.

20. A method, as in claim 16, where the operating system creates one or more of the threads from the executable binary versions and each of the threads is simultaneously executed by one or more cores within one or more of the CPUs.

* * * * *